R. CARLSON.
HEAT CONTROLLER FOR AUTOMOBILE RADIATORS.
APPLICATION FILED DEC. 29, 1916.
1,248,073.
Patented Nov. 27, 1917.
2 SHEETS—SHEET 1.
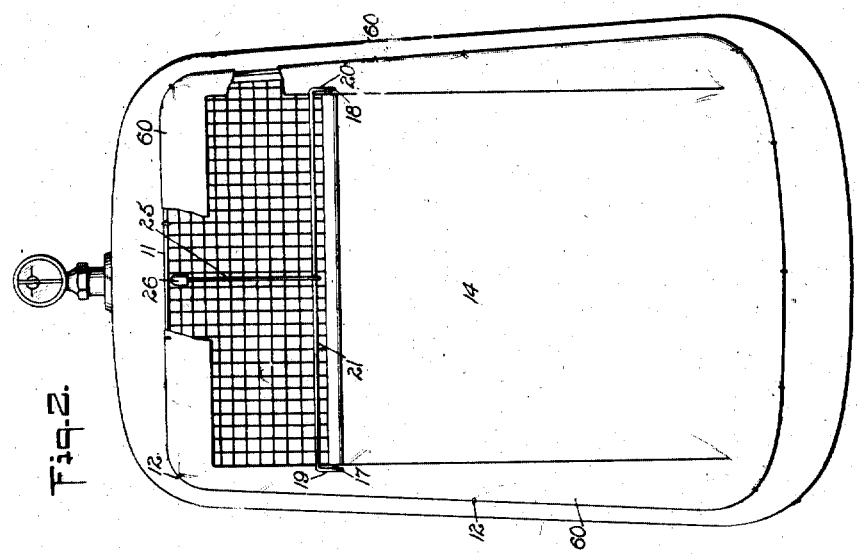
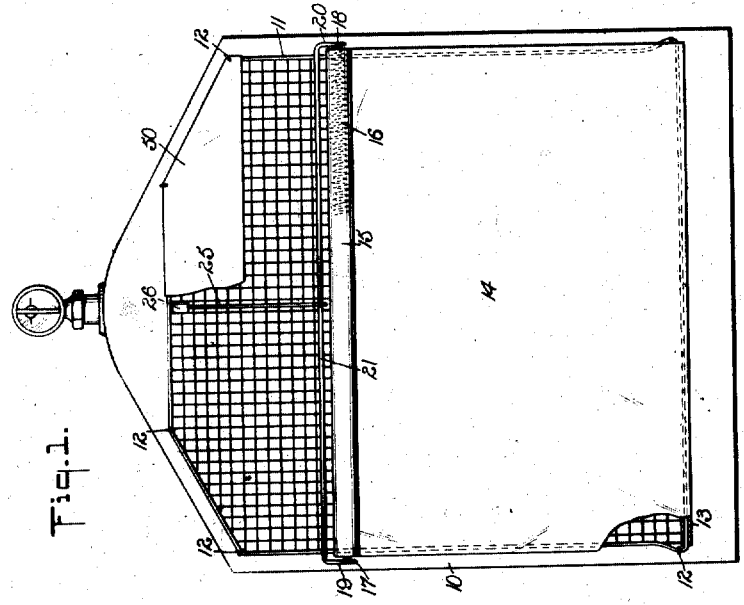
WITNESSES
INVENTOR
Rudolph Carlson
BY
ATTORNEYS

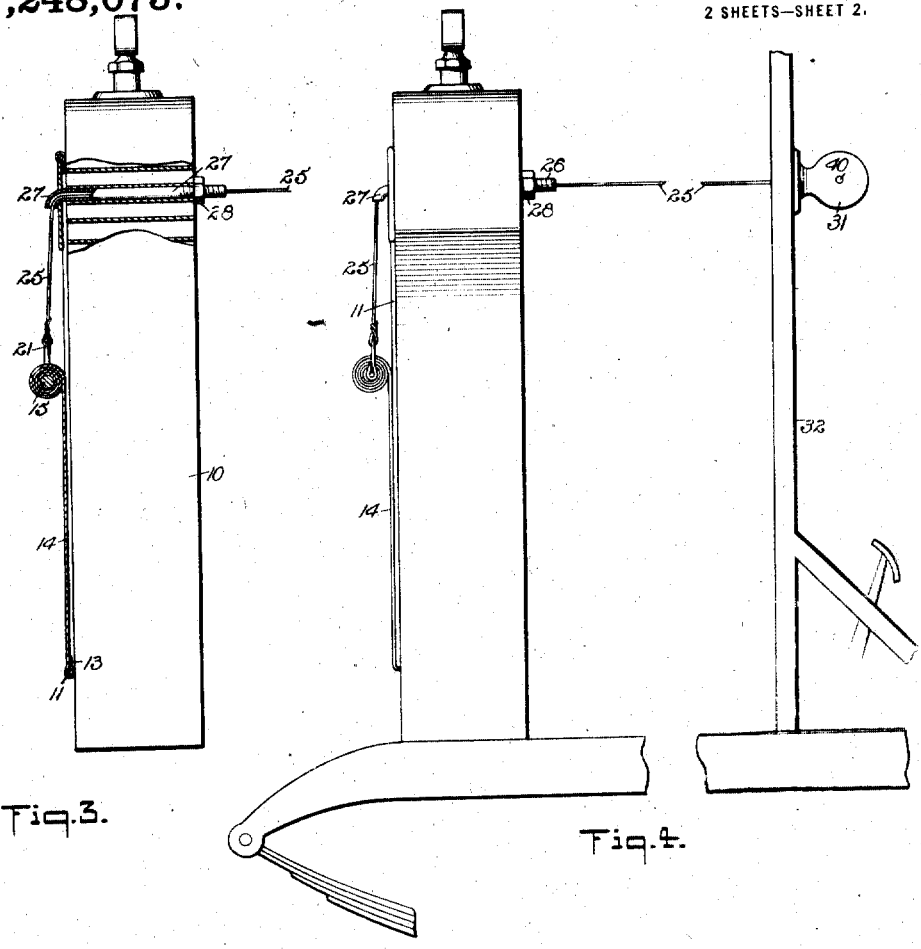

UNITED STATES PATENT OFFICE.

RUDOLPH CARLSON, OF FARMINGDALE, NEW YORK.

HEAT-CONTROLLER FOR AUTOMOBILE-RADIATORS.

1,248,073. Specification of Letters Patent. Patented Nov. 27, 1917.

Application filed December 29, 1916. Serial No. 139,507.

*To all whom it may concern:*

Be it known that I, RUDOLPH CARLSON, a subject of the King of Sweden, and a resident of Farmingdale, in the county of Nassau and State of New York, have invented a new and Improved Heat-Controller for Automobile-Radiators, of which the following is a full, clear, and exact description.

The object of the invention is to provide a new and improved heat controller for automobile radiators arranged to enable the driver of the automobile to control the heat in the hood with a view to insure proper running of the engine in all kinds of weather. Another object is to permit of conveniently and quickly attaching the heat controller to various types of automobiles as now constructed.

In order to accomplish the desired result, use is made of a light frame adapted to be attached to the front of the automobile radiator along the walls of the opening thereof, a curtain movable over the front of the radiator and attached at its lower end to the said frame, a roller on which winds the upper end of the curtain, a support for the said roller, and operating means connected with the said roller frame and extending to the dashboard of the automobile to be within convenient reach of the driver to enable the latter to adjust the curtain with a view to admit more or less air to the radiator to regulate the heat within the hood.

A practical embodiment of the invention is represented in the accompanying drawings forming a part of this specification, in which similar characters of reference indicate corresponding parts in all the views.

Figure 1 is a front elevation of the heat controller as applied, parts being shown broken out;

Fig. 2 is a similar view of the same as applied to a radiator of a different shape than the one shown in Fig. 1;

Fig. 3 is a sectional side elevation of the heat controller in position on the radiator shown in elevation with parts in section;

Fig. 4 is a side elevation of the heat controller as applied to the radiator and dashboard;

Fig. 5 is an enlarged side elevation of the actuating mechanism of the dashboard;

Fig. 6 is a cross section of the same; and

Fig. 7 is a sectional side elevation of the same.

On the front of the automobile radiator 10 and following the walls of the opening thereof is secured a light wire frame 11 by the use of suitable fastening devices 12 such as fine wire and the like. To the bottom of the frame 11 is secured the lower end 13 of a curtain 14 winding at its upper portion on a roller 15 provided with a spring 16 and with trunnions 17 and 18 held in bearings 19 and 20 of a bracket 21. The spring 16 is attached at one end to the roller 15 and at the other end to the trunnion 18 which latter is held stationary in the bearing 20 while the other trunnion 17 is mounted to rotate in its bearing 19. The arrangement is such that when the bracket 21 is raised the curtain 14 unwinds from the roller 15 and the spring 16 therefor is compressed, and when the support 21 is lowered then the spring 16 uncoils and rotates the roller 15 in the reverse direction to wind up the curtain 14. Thus by raising or lowering the bracket 21 the curtain 14 is stretched over any desired portion of the radiator front opening so as to permit more or less or no air to pass through the radiator into the hood under which the engine is located.

In order to raise or lower the bracket 21 the middle thereof is attached to one end of a cord, cable or similar flexible connection, extending upwardly and passing through a pipe 26 extending lengthwise through an opening in the radiator 10, as plainly indicated in Figs. 3 and 4. The forward end 27 of the pipe 26 is curved downward to permit ready entrance of the flexible connection 25 to the pipe 26. The rear end of the pipe 27 is threaded and on this threaded portion screws a nut 28 to securely hold the pipe 27 in place on the radiator 10.

The flexible connection 25 after leaving the pipe 27 extends through the hood and winds on a drum 30 mounted in a casing 31 attached to the front of the dashboard 32 provided with an opening 33 (see Fig. 7) for the passage of the flexible connection 25. The casing 31 is provided with guide rollers 34, 35 for guiding the flexible connection 25 to the drum 30. On the shaft 40 of the drum 30 is pivoted a handle 41 under the control of the driver in charge of the automobile, to permit the driver to turn the drum 30 with a view to wind up or unwind the flexible connection 25 to raise or lower the curtain 14 with a view to cover more or less of the front opening of the radiator. The handle 41 is adapted to be locked on lugs 42 formed on the face of the casing 31 next to the handle 41 so as to hold the curtain 14 in adjusted position for the time being.

It is understood that automobiles as now generally constructed are provided with motometers to enable the driver to watch the working of the engine and in case the engine does not work with the fullest efficiency owing to a change in the weather and a consequent change of temperature within the hood then the operator can readily adjust the curtain 14, as above explained, to control the inflow of the air into the hood by way of the radiator. It is further understood that the temperature within the hood affects the working of the engine and by the arrangement described the driver is enabled to control the temperature within the hood to obtain the highest efficiency of the engine.

The portions of the radiator front opening not reached by the curtain 14 are covered by a piece of screening cloth 50 attached to the frame 11, as indicated in Fig. 1. In case the radiator is of the shape shown in Fig. 2 then an extra piece of screening cloth 60 is attached to the frame 11 to provide a rectangular opening to be more or less covered by the curtain 14. Otherwise, the construction is exactly the same as above described in reference to the curtain shown in Fig. 1.

Having thus described my invention, I claim as new and desire to secure by Letters Patent:—

1. The combination with an automobile radiator, a frame secured to the front thereof and surrounding the front opening of the same, a curtain secured at its lower end to the lower end of said frame, a spring roller secured to the upper end of said curtain, a stationary screening cloth secured to the upper part of said frame and covering the radiator portion out of reach of the curtain, and a flexible connection from the spring roller to the dashboard of the automobile, said flexible connection passing through said stationary screening cloth, and means on the dashboard for holding the curtain in adjusted position in front of the radiator.

2. In a heat controller for automobile radiators, consisting of a curtain secured at its lower end to the front of the radiator, a spring actuated roller secured to the upper end of the curtain for winding and unwinding the same, a flexible connection from the spring roller to the dashboard of the automobile, a stationary screening cloth covering the portion of the radiator out of reach of the curtain, guiding means for said flexible connection, said means including a pipe passing through the stationary screening cloth and through the radiator and removably held in the radiator, and means for holding the flexible connection in adjusted positions.

3. A heat controller for automobile radiators, comprising a curtain having its lower end attached to the front of said radiator, a roller on which the upper end of the said curtain winds and unwinds, means for winding and unwinding said curtain, and a stationary screening cloth mounted on the front of said radiator and adapted to cover the radiator portions out of reach of the said curtain when unwound.

4. A heat controller for automobile radiators comprising a stationary screening cloth detachably secured to the front thereof and normally covering a portion thereof, a spring roller curtain secured at its lower end at the lower end of the radiator, and adapted to be unrolled to cover the portion of the radiator not covered by the detachable stationary screening cloth, and flexible means for connecting the curtain with the dashboard of the automobile.

RUDOLPH CARLSON